US008798364B2

(12) United States Patent
Zhu et al.

(10) Patent No.: US 8,798,364 B2
(45) Date of Patent: Aug. 5, 2014

(54) IMAGE PROCESSING SYSTEM AND IMAGE PROCESSING METHOD

(75) Inventors: Yi-Fei Zhu, Shanghai (CN); Chu-Yang Hong, Shanghai (CN); Guo-Feng Zhang, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 173 days.

(21) Appl. No.: 13/479,291

(22) Filed: May 24, 2012

(65) Prior Publication Data

US 2012/0301027 A1 Nov. 29, 2012

(30) Foreign Application Priority Data

May 26, 2011 (CN) .......................... 2011 1 0138165

(51) Int. Cl.
*G06K 9/00* (2006.01)
(52) U.S. Cl.
USPC .......................................... 382/167; 382/162
(58) Field of Classification Search
None
See application file for complete search history.

(56) References Cited

U.S. PATENT DOCUMENTS

| 7,397,499 | B2* | 7/2008 | Okada et al. ............... 348/208.13 |
| 8,098,294 | B2* | 1/2012 | Nashizawa ................. 348/222.1 |
| 2006/0013479 | A1* | 1/2006 | Trimeche et al. ............. 382/167 |
| 2006/0093234 | A1* | 5/2006 | Silverstein .................... 382/255 |
| 2006/0239549 | A1* | 10/2006 | Kelly et al. ................... 382/167 |
| 2007/0097267 | A1* | 5/2007 | Sakurai et al. ............... 348/571 |
| 2008/0298678 | A1* | 12/2008 | Kang ............................. 382/167 |
| 2009/0046944 | A1* | 2/2009 | Bilcu et al. .................... 382/274 |
| 2009/0207271 | A1* | 8/2009 | Utsugi et al. ............... 348/223.1 |
| 2009/0251569 | A1* | 10/2009 | Nonaka ....................... 348/240.1 |
| 2010/0165208 | A1* | 7/2010 | Terasawa ....................... 348/624 |
| 2010/0259537 | A1* | 10/2010 | Ben-Himane et al. ........ 345/419 |
| 2011/0103686 | A1* | 5/2011 | Kano ............................. 382/167 |
| 2011/0157432 | A1* | 6/2011 | Han et al. ...................... 348/241 |
| 2012/0007940 | A1* | 1/2012 | Michrowski et al. ...... 348/14.07 |
| 2012/0057041 | A1* | 3/2012 | Stec et al. .................... 348/222.1 |
| 2012/0106841 | A1* | 5/2012 | Tzur et al. .................... 382/167 |
| 2013/0016275 | A1* | 1/2013 | Hokoi .......................... 348/345 |
| 2013/0100310 | A1* | 4/2013 | Ebihara ....................... 348/222.1 |

OTHER PUBLICATIONS

F. Guichard et al., "Extended Depth-of-Field using Sharpness Transport across Colour Channels", SPIE, Proceedings of Electronic Imaging, 2009.*
Willson, Reg G., and Steven A. Shafer. Dynamic lens compensation for active color imaging and constant magnification focusing. No. CMU-RI-TR-91-26. Carnegie-Mellon Univ Pittsburgh PA Robotics Inst, 1991.*
J. Bescos, I. Glaser, and A. A. Sawchuk, "Restoration of color images degraded by chromatic aberrations", Applied Optics, vol. 19, Issue 22, pp. 3869-3876 (1980).*

(Continued)

*Primary Examiner* — Li Liu
(74) *Attorney, Agent, or Firm* — Jianq Chyun IP Office (57) ABSTRACT

An image processing apparatus and a method thereof are provided. A plurality of target blur radii are obtained by calculating blur radiuses corresponding to the out of focus transform function between a deblurred datum color channel image and the other color channel images. A plurality of deblurred color channel images are obtained by respectively performing deblurring operations on the original channel images according to the target blur radii that corresponding to the original channel images. The deblurred datum color channel image and the deblurred color channel images are combined to obtain a blur calibrated image. Accordingly, the image out of focus problem induced by dispersion can be solved.

24 Claims, 6 Drawing Sheets

(56) References Cited

OTHER PUBLICATIONS

Alan C. Bovik, "Hand Book of Image and Video Processing", Academic Press, Jun. 14, 2000, pp. 3-17, p. 161-174.

Richard P. Feynman, "The Feynman Lectures on Physics", Addison Wesley Longman, Jun. 1970, p. 27-1-27-8.

David G. Lowe, "Distinctive image features from scale-invariant keypoints," International Journal of Computer Vision, vol. 60, No. 2, Nov. 2004, p. 91-110.

* cited by examiner

IMAGE PROCESSING SYSTEM AND IMAGE PROCESSING METHOD

CROSS-REFERENCE TO RELATED APPLICATION

This application claims the priority benefit of China application serial no. 201110138165.1, filed on May 26, 2011. The entirety of the above-mentioned patent application is hereby incorporated by reference herein and made a part of this specification.

BACKGROUND OF THE INVENTION

1. Field of the Invention

The invention generally relates to an image processing technique, and more particularly, to an image processing system and an image processing method in which the problem of dispersion is resolved.

2. Description of Related Art

Optical lenses are broadly applied to cameras, video cameras, telescopes, and microscopes, etc. Optical lenses can be categorized into refractive lenses, reflective lenses, and refractive/reflective lenses. Refractive lenses are most commonly used. A refractive lens can form the image of an object on a focal plane through refraction of light. However, refraction lenses come with the dispersion problem. To be specific, because lights of different colors have different frequencies and different refractive indexes. This causes different colored lights to have different focal lengths on a specific lens, resulting in an out of focus condition at an imaging position for the different colored lights.

One of the conventional techniques for resolving the dispersion problem focuses on the lens. In such a technique, a special material (for example, fluorite) is used to compensate dispersion. However, this kind of material is usually very expensive. In another conventional technique for resolving the dispersion problem, a complicated optical path design is adopted to compensate dispersion. Both of aforementioned two techniques increase the cost of high-quality lenses and offer poor dispersion reduction effect in high-resolution images.

Thereby, a new technique for resolving the problem of image dispersion is provided in the invention. This new technique does not increase hardware cost and offers a better dispersion reduction performance compared to the conventional techniques.

SUMMARY OF THE INVENTION

The invention provides an image processing system and an image processing method thereof, in which an image out of focus problem induced by dispersion can be solved.

The invention provides an image processing method including the following steps. A plurality of original color channel images is generated according to an original image. A sharpest one of the original color channel images is selected from the original color channel images as a deblurred datum color channel image. A blur radius value corresponding to an out of focus transform function between the deblurred datum color channel image and the other original color channel images is trialled, so as to obtain a plurality of target blur radius values. A deblurring operation is respectively performed on the original color channel image corresponding to each of the target blur radius values according to the target blur radius value, so as to obtain a plurality of deblurred color channel images. The deblurred datum color channel image and the deblurred color channel images are combined to obtain a blur calibrated image.

According to an embodiment of the invention, the steps for selecting the sharpest original color channel image from the original color channel images as the deblurred datum color channel image includes: the sharpest original color channel image is selected by respectively performing a frequency spectrum analysis on the original color channel images, and according to a result of the frequency spectrum analysis, selecting the original color channel image having the largest high frequency component as the deblurred datum color channel image.

According to an embodiment of the invention, the steps for trialing the blur radius value corresponding to the out of focus transform function between the deblurred datum color channel image and the other original color channel images includes the following steps. A blurring operation is performed on the deblurred datum color channel image according to a predetermined blur radius value to obtain a plurality of trial color channel images. Whether the similarity between each of the trial color channel images and the corresponding original color channel image reaches a predetermined standard is determined. When the similarity does not reach the predetermined standard, the predetermined blur radius value is adjusted. When the similarity reaches the predetermined standard, the blur radius value is served as a target blur radius value.

The invention provides an image processing system, including a color channel image generation module, a sharpness selection module, a calculation module, and an image combination module. The color channel image generation module generating a plurality of original color channel images according to an original image. The sharpness selection module selecting a sharpest original color channel image from the original color channel images as a deblurred datum color channel image. The calculation module trialing a blur radius value corresponding to an out of focus transform function between the deblurred datum color channel image and the other original color channel images, so as to obtain a plurality of target blur radius values, and respectively performs a deblurring operation on the original color channel image corresponding to each of the target blur radius values according to the target blur radius value, so as to obtain a plurality of deblurred color channel images. The image combination module combining the deblurred datum color channel image and the deblurred color channel images to obtain a blur calibrated image.

According to an embodiment of the invention, the sharpness selection module further respectively performs a frequency spectrum analysis on the original color channel images, and according to a result of the frequency spectrum analysis, the sharpness selection module selects the original color channel image having the largest high frequency component as the deblurred datum color channel image.

According to an embodiment of the invention, the calculation module further performs a blurring operation on the deblurred datum color image according to a predetermined blur radius, so as to obtain a plurality of trial color channel images, and the calculation module determines whether the similarity between each of the trial color channel images and the corresponding original color channel image reaches a predetermined standard, wherein the predetermined blur radius is adjusted when the similarity degree does not reach the predetermined standard, and the blur radius value is served as a target blur radius value when the similarity reaches the predetermined standard.

According to an embodiment of the invention, the image processing system further includes an image feature recognition module respectively performing a feature point recognition algorithm on the original color channel images, so as to respectively find out a plurality of feature points in each of the original color channel images.

According to an embodiment of the invention, the calculation module further calculates transformation matrixes between every two of the original color channel images according to the feature points, and the calculation module selects a shift datum color channel image from the original color channel images, and according to transformation matrixes corresponding to the shift datum color channel image, the calculation module transforms the other original color channel images, so as to obtain a plurality of shift calibrated color channel images, wherein the original color channel image corresponding to the shift datum color channel image has the minimum distortion.

According to an embodiment of the invention, the image combination module further combines the shift datum color channel image and the shift calibrated color channel images to obtain a shift calibrated image, and the image combination module combines the blur calibrated image and the shift calibrated image to obtain a final calibrated image.

According to an embodiment of the invention, the calculation module further calculates a plurality of transformation feature points according to the feature points, the calculation module calculates transformation matrixes according to the transformation feature points, wherein each of the transformation feature points has a corresponding pixel in each of the original color channel images.

According to an embodiment of the invention, the calculation module selects the shift datum color channel image from the original color channel images according to the transformation matrixes.

According to an embodiment of the invention, the calculation module further calculates modulus of the transformation matrixes, and calculates modulus of the transformation matrixes corresponding to the original color channel images being transformed to a virtual shift datum color channel image when each of the original color channel images is served as the virtual shift datum color channel image, and the calculation module further selects the shift datum color channel image according to modulus of the transformation matrixes corresponding to the original color channel images when each of the original color channel images is served as the virtual shift datum color channel image.

According to an embodiment of the invention, the calculation module further calculates modulus sum of the corresponding transformation matrixes when each of the original color channel images is served as the virtual shift datum color channel image and selects the original color channel image having the smallest modulus sum as the shift datum color channel image.

According to an embodiment of the invention, the blurring operation is to perform a convolution operation on the out of focus transform function and the deblurred datum color channel image, and the deblurring operation is to perform a deconvolution operation on the out of focus transform function and the deblurred datum color channel image.

According to an embodiment of the invention, the deblurring operation includes a Wiener filter deconvolution operation, a Lucy-Richardson operation, or a regularized operation.

According to an embodiment of the invention, the feature point comparison algorithm includes a scale-invariant feature transform (SIFT) algorithm or a speeded-up robust features (SURF) algorithm.

The invention provides an image processing method including the following steps. A plurality of original color channel images is generated according to an original image. A sharpest one of the original color channel images is selected from the original color channel images as a deblurred datum color channel image. A blur radius value corresponding to an out of focus transform function between the deblurred datum color channel image and the other original color channel images is trialled, so as to obtain a plurality of target blur radius values. A deblurring operation is respectively performed on the original color channel image corresponding to each of the target blur radius values according to the target blur radius value, so as to obtain a plurality of deblurred color channel images. Respectively performing a feature point recognition algorithm on the original color channel images, so as to respectively find out a plurality of feature points in each of the original color channel images. Calculating the transformation matrixes between every two of the original color channel images according to the feature points. Selecting a shift datum color channel image from the original color channel images, wherein the original color channel image corresponding to the shift datum color channel image has the minimum distortion. Transforming the other original color channel images according to transformation matrixes corresponding to the shift datum color channel image, so as to obtain a plurality of shift calibrated color channel images. Combining the deblurred datum color channel image, the deblurred color channel images, the shift datum color image, and the shift calibrated color images to obtain a final calibrated image.

In summary, embodiments of the invention calculate a plurality of blur radii corresponding to the out of focus transform function between the deblurred datum color channel image and the other original color channel images, so as to obtain a plurality of target blur radii. Moreover, according to each of the target blur radii that corresponds to the other original color channel images, a deblurring operation is respectively performed on the other original color channel images, so as to obtain a plurality of deblurred color channel images. By combining the deblurred datum color channel image and the deblurred color channel images, a blur calibrated image is obtained. Accordingly, without spending extra resources on hardware, an image out of focus problem induced by dispersion can be eliminated, thereby drastically improving the image quality.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
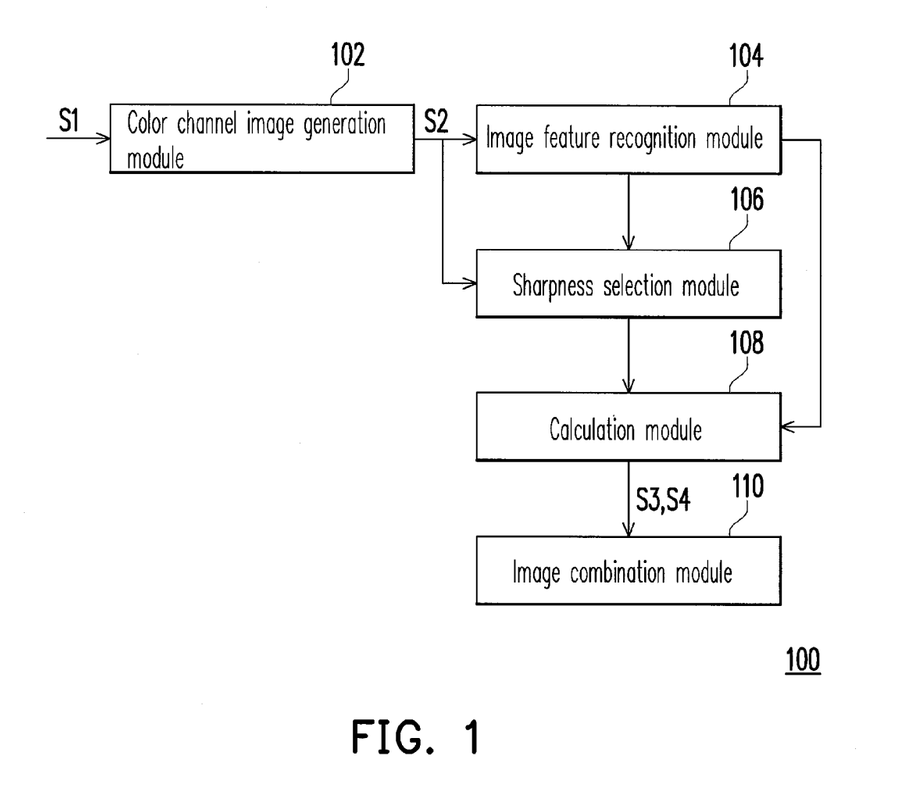
FIG. 1 is a diagram of an image processing system according to an embodiment of the invention.

FIG. 1 is a diagram of an image processing system according to an embodiment of the invention. The image processing system 100 is adapted for a photography device, wherein the photography device can be a camera, a video camera, a telescope, or a microscope, etc. The image processing system 100 includes a color channel image generation module 102, an image feature recognition module 104, a sharpness selection module 106, a calculation module 108, and an image combination module 110. The color channel image generation module 102 generates a plurality of original color channel images S2 according to an original image S1. For example, the original image S1 can be divided into red channel images, green channel images, and blue channel images. It should be noted that the number and colors of the original color channel images S2 generated according to the original image S1 are not limited to those mentioned in the present embodiment. For example, the original image S1 may also be divided into cyan channel images, purple channel images, yellow channel images, and black channel images or cyan channel images, purple channel images, and yellow channel images.

The image feature recognition module 104 executes a feature point recognition algorithm respectively on the original color channel images S2 to find out a plurality of feature points in each of the original color channel images S2. Herein the feature point recognition algorithm is a feature point comparison algorithm, such as the scale-invariant feature transform (SIFT) algorithm or the speeded-up robust features (SURF) algorithm.

The calculation module 108 finds out a plurality of transformation feature points in each of the original color channel images S2 according to the feature points obtained by the image feature recognition module 104, so as to calculate transformation matrixes between the original color channel images S2. It should be noted that each of the transformation feature points has a corresponding pixel in each of the original color channel images S2. For example, assuming that in the present embodiment, the original color channel images S2 generated according to the original image S1 are red channel images, green channel images, and blue channel images, if a red feature point is selected, the feature point only has corresponding pixels in the red channel images. If a grey feature point is selected, the feature point has corresponding pixels in all the red channel images, the green channel images, and the blue channel images. Such feature points which have corresponding pixels in all the original color channel images S2 are the transformation feature points. Relative distances between pixels corresponding to each transformation feature point in different original color channel images S2 are smaller than three pixels wide.

In the present embodiment, because the transformations of the original color channel images S2 are two-dimensional transformations, regarding the transformation of each original color channel image S2, 9 transformation feature points are required to obtain a 3×3 transformation matrix, wherein the transformation matrix may be a rotation matrix or a translation matrix. After obtaining the transformation matrixes between the original color channel images S2, a shift datum color channel image is selected according to the transformation matrixes. Because distortion may be produced when the color channel images are transformed, the original color channel images S2 with the minimum distortion should be selected as the shift datum color channel image.

Herein it is assumed that the original color channel images S2 in the present embodiment include red channel images, green channel images, and blue channel images. To select the shift datum color channel image from the original color channel images S2, the calculation module 108 first respectively calculates modulus of the corresponding transformation matrixes between a virtual shift datum color channel image and the other original color channel images S2 when each of the red channel images, the green channel images, and the blue channel images is served as the virtual shift datum color channel image. For example, when a red channel image is served as the virtual shift datum color channel image, the calculation module 108 calculates modulus of the corresponding transformation matrixes for transforming the green channel images and the blue channel images into the red channel image. Accordingly, the calculation module 108 can select the shift datum color channel image according to the modulus of the corresponding transformation matrixes when each of the original color channel images S2 is served as the virtual shift datum color channel image. For example, the calculation module 108 calculates a modulus of the corresponding transformation matrixes when each of the original color channel images is served as the virtual shift datum color channel image and selects the original color channel image S2 having the smallest modulus sum as the shift datum color channel image.

After selecting the shift datum color channel image, the calculation module 108 transforms the original color channel images S2 other than the shift datum color channel image according to the transformation matrixes corresponding to the shift datum color channel image, so as to obtain a plurality of shift calibrated color channel images S3. The image combination module 110 combines the shift calibrated color channel images S3 and the shift datum color channel image to obtain a shift calibrated image.

As described above, transformation matrixes between different color channel images are obtained according to feature points in the color channel images, and the transformation matrix with the minimum distortion is selected to determine a shift datum color channel image. Besides, the other color channel images are transformed according to the transformation matrixes corresponding to the shift datum color channel image, and the other transformed color channel images and the shift datum color channel image are combined to obtain a shift calibrated image. Thereby, the problem of purple fringing caused by dispersion can be resolved and the image quality can be greatly improved without increasing the hardware cost. This effect is very obvious while being applied to an imaging apparatus with a wide angle lens.

Besides the image shift problem mentioned above, optical lenses may also produce image blur problem because lights of different colors have different focal lengths. The image blur problem can also be resolved by adopting the image processing system 100 illustrated in FIG. 1. As shown in FIG. 1, the sharpness selection module 106 selects the sharpest one of the original color channel images S2 generated by the color channel image generation module 102 as a deblurred datum color channel image. The sharpness selection module 106 may select the deblurred datum color channel image by respectively performing a frequency spectrum analysis on the original color channel images S2 (for example, performing Fourier tranforms on the original color channel images S2) and selecting the original color channel image S2 having the greatest high frequency component as the deblurred datum color channel image according to the results of the frequency spectrum analyses.

The calculation module 108 trials a blur radius value corresponding to an out of focus transform function between the deblurred datum color channel image and the other original color channel images, so as to obtain a plurality of target blur radius values. For example, the calculation module 108 first performs a blurring operation on the deblurred datum color channel image according to a predetermined blur radius value, so as to obtain a plurality of trial color channel images, wherein the blurring operation is to perform a convolution operation on the out of focus transform function and the deblurred datum color channel image. After obtaining the trial color channel images, the calculation module 108 determines whether the similarity between each of the trial color channel images and the corresponding original color channel image reaches a predetermined standard.

If the similarity between a trial color channel image and the corresponding original color channel image S2 does not reach the predetermined standard, the predetermined blur radius value is adjusted to obtain a new trial color channel image. If the similarity between a trial color channel image and the corresponding original color channel image S2 reaches the predetermined standard, the adjusted predetermined blur radius value is served as a target blur radius value. Herein the similarity between a trial color channel image and the corresponding original color channel image S2 can be determined according to the sum of absolute difference (SAD) of the greyscales of the two images, and when the SAD of the greyscales is smaller than a predetermined value (i.e., the predetermined standard), it is determined that the similarity reaches the predetermined standard.

The calculation module 108 respectively executes a deblurring operation on the original color channel images S2 corresponding to the target blur radius values according to the target blur radius values, so as to obtain a plurality of deblurred color channel images S4. Herein the deblurring operation is to perform a deconvolution operation on the out of focus transform function and each of the original color channel images S2, and which may be a Wiener filter deconvolution operation, a Lucy-Richardson operation, or a Regularized operation. In addition, the image combination module 110 combines the deblurred datum color channel image and the deblurred color channel images S4 to obtain a blur calibrated image.

As described above, a plurality of target blur radius values is obtained by trialling a blur radius value corresponding to an out of focus transform function between the deblurred datum color channel image and the other original color channel images S2, and a plurality of deblurred color channel images S4 is obtained by performing a deblurring operation on the original color channel image S2 corresponding to each target blur radius value according to the target blur radius value. By combining the deblurred datum color channel image and the deblurred color channel images S4, a blur calibrated image is obtained. Thereby, the image blur problem caused by dispersion can be resolved and the image quality can be greatly improved without increasing the hardware cost. This effect is very obvious while being applied to an image apparatus with a telephoto lens.

It should be noted that besides performing either shift calibration or blur calibration on an original image according to different situation, the image processing system 100 can also perform both shift calibration and blur calibration on an original image. For example, the calculation module 108 respectively performs aforementioned shift calibration and blur calibration according to the original color channel images S2 generated by the color channel image generation module 102, so as to obtain a deblurred datum color channel image, a plurality of deblurred color channel images, a shift datum color channel image, and a plurality of shift calibrated color channel images. The image combination module 110 combines the deblurred datum color channel image, the deblurred color channel images, the shift datum color channel image, and the shift calibrated color channel images to obtain a final calibrated image. Thereby, both the shift calibration and the blur calibration effects can be achieved.

In some embodiments, the calculation module 108 may also perform the shift calibration and then the blur calibration on the original color channel images S2. In this case, after the calculation module 108 performs the shift calibration on the original color channel images S2 and obtains the shift calibrated color channel images, the calculation module 108 selects the sharpest one of the shift calibrated color channel images as the deblurred datum color channel image through the blur calibration technique described above and trials a blur radius value corresponding to the out of focus transform function between the deblurred datum color channel image and the other shift calibrated color channel images to obtain a plurality of target blur radius values. After that, the calculation module 108 respectively executes a deblurring operation on the other shift calibrated color channel images corresponding to the target blur radius values according to the target blur radius values, so as to obtain a plurality of deblurred color channel images S4. Finally, the image combination module 110 combines the deblurred datum color channel image and the deblurred color channel images S4 into a final calibrated image.

The method of performing blur calibration on the shift calibrated color channel images is the same as the method of performing blur calibration on the original color channel images S2, and the only difference is that the object of the blur calibration changes from the original color channel images S2 to the shift calibrated color channel images. Implementations of the invention should be understood by those having ordinary knowledge in the art based on the descriptions of foregoing embodiments therefore will not be described herein.

Similarly, the calculation module 108 may also perform the blur calibration and then the shift calibration on the original color channel images S2. In this case, after the calculation module 108 performs the blur calibration on the original color channel images S2 and obtains the deblurred color channel images S4, the calculation module 108 respectively executes a feature point recognition algorithm on the deblurred color channel images S4 through the shift calibration method described above to obtain transformation matrixes between every two of the deblurred color channel images S4, and the calculation module 108 selects a shift datum color channel image from the deblurred color channel images S4 and transforms the other deblurred color channel images S4 according to the transformation matrixes corresponding to the shift datum color channel image, so as to obtain a plurality of shift calibrated color channel images. Finally, the image combination module 110 combines the shift datum color channel image and the shift calibrated color channel images into a final calibrated image.

The method of performing shift calibration on the deblurred color channel images is the same as the method of performing shift calibration on the original color channel images S2, and the only difference is that the object of the shift calibration changes from the original color channel images S2 to the deblurred color channel images. Implementations of the invention should be understood by those having ordinary knowledge in the art based on the descriptions of foregoing embodiments therefore will not be described herein.

Figure 2:
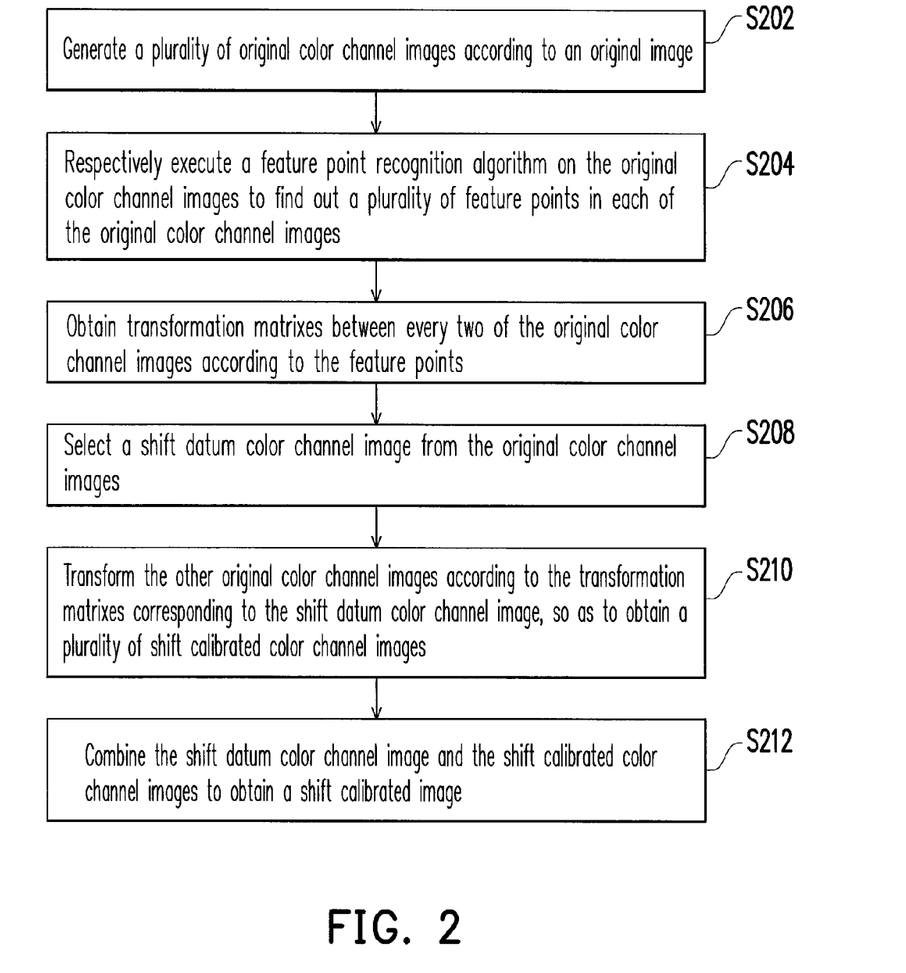
FIG. 2-FIG. 6 are flowcharts of image processing methods according to embodiments of the invention.

FIG. 2 is a flowchart of an image processing method according to an embodiment of the invention. Referring to FIG. 2, the method for the image processing system 100 to perform shift calibration on an image includes following steps. First, a plurality of original color channel images is generated according to an original image (step S202). Then, a feature point recognition algorithm is respectively executed on the original color channel images to find out a plurality of feature points in each of the original color channel images (step S204). Herein the feature point recognition algorithm may be the SIFT algorithm or the SURF algorithm.

Next, transformation matrixes between every two of the original color channel images are obtained according to the feature points (step S206). After that, a shift datum color channel image is selected from the original color channel images (step S208), wherein the original color channel image corresponding to the shift datum color channel image has the minimum distortion. Then, the other original color channel images are transformed according to the transformation matrixes corresponding to the shift datum color channel image, so as to obtain a plurality of shift calibrated color channel images (step S210). The shift datum color channel image can be selected according to modulus of the transformation matrixes between the original color channel images. For example, the original color channel image having a smallest modulus sum may be selected as the shift datum color channel image. Finally, the shift datum color channel image and the shift calibrated color channel images are combined to obtain a shift calibrated image (step S212). Thereby, the problem of purple fringing caused by dispersion can be resolved and the image quality can be greatly improved without increasing the hardware cost.

Figure 3:
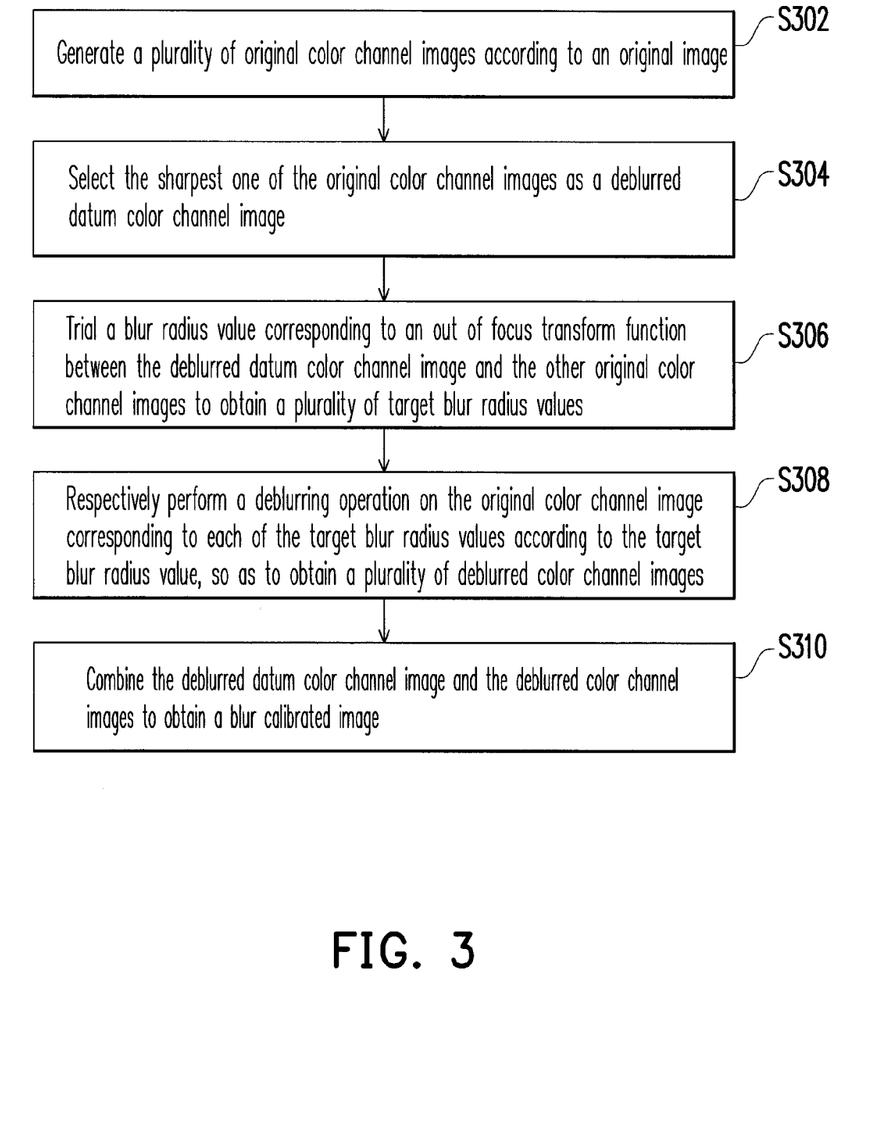

FIG. 3 is a flowchart of an image processing method according to another embodiment of the invention. Referring to FIG. 3, the method for the image processing system 100 to perform blur calibration on an image includes following steps. First, a plurality of original color channel images is generated according to an original image (step S302). Then, the sharpest one of the original color channel images is selected as a deblurred datum color channel image (step S304). The sharpest original color channel image can be selected by respectively performing a frequency spectrum analysis on the original color channel images and selecting the original color channel image having the largest high frequency component as the deblurred datum color channel image.

Thereafter, a blur radius value corresponding to an out of focus transform function between the deblurred datum color channel image and the other original color channel images is trialled, so as to obtain a plurality of target blur radius values (step S306). For example, a blurring operation is performed on the deblurred datum color channel image according to a predetermined blur radius value to obtain a plurality of trial color channel images, and whether the similarity between each of the trial color channel images and the corresponding original color channel image reaches a predetermined standard is determined. If the similarity does not reach the predetermined standard, the predetermined blur radius value is adjusted until the similarity reaches the predetermined standard. The blur radius value when the similarity reaches the predetermined standard is served as a target blur radius value.

Next, a deblurring operation is respectively performed on the original color channel image corresponding to each of the target blur radius values according to the target blur radius value, so as to obtain a plurality of deblurred color channel images (step S308). Herein the deblurring operation is to perform a deconvolution operation on the out of focus transform function and the deblurred datum color channel image, and which may be a Wiener filter deconvolution operation, a Lucy-Richardson operation, or a Regularized operation. Finally, the deblurred datum color channel image and the deblurred color channel images are combined to obtain a blur calibrated image (step S310). Thereby, the problem of image blur caused by dispersion can be resolved and the image quality can be greatly improved without increasing the hardware cost.

Figure 4:
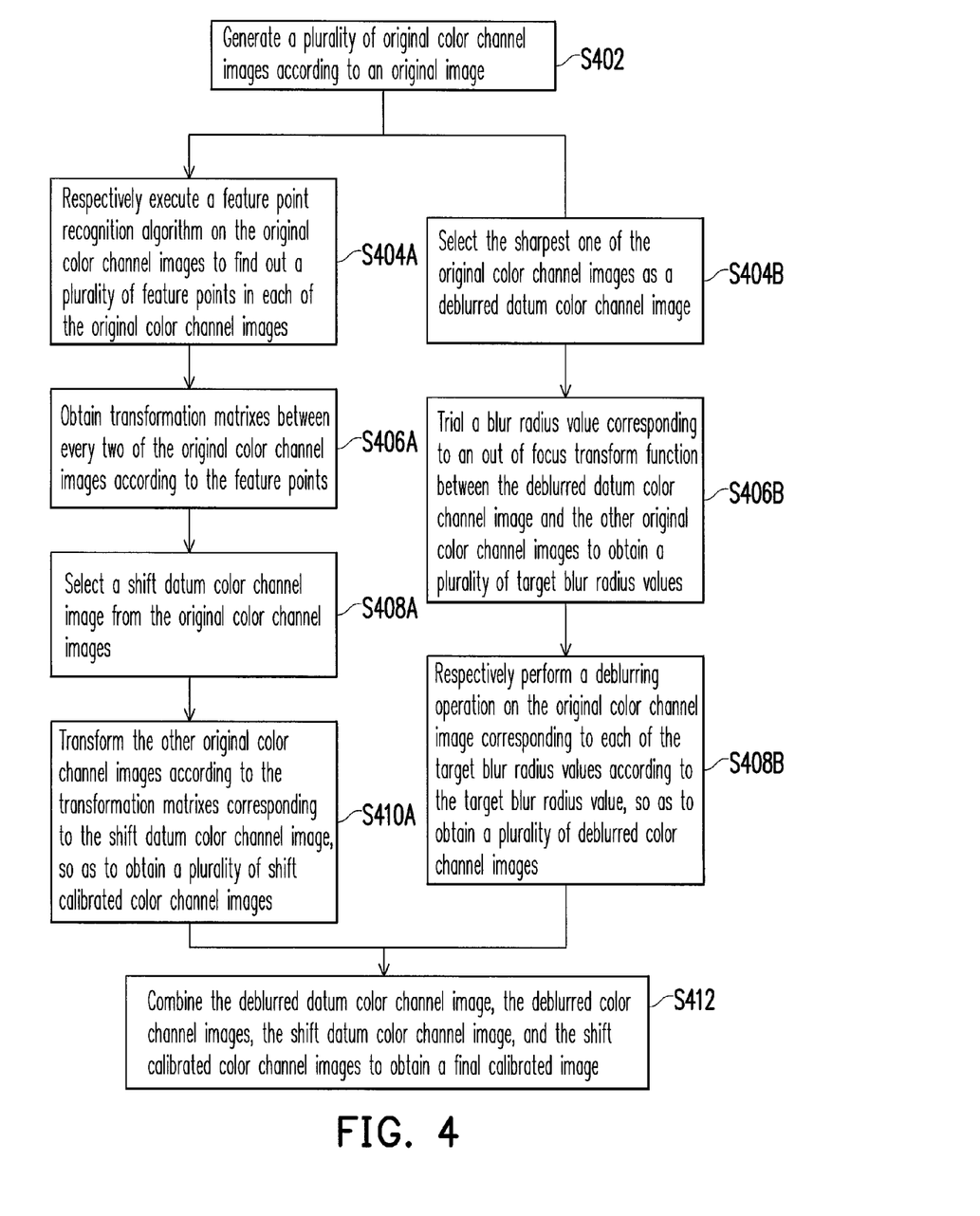

Additionally, the image processing system 100 can perform both shift calibration and blur calibration, as illustrated in FIGS. 4-6. FIG. 4 is a flowchart of an image processing method according to yet another embodiment of the invention. Referring to FIGS. 2-4, first, a plurality of original color channel images is generated according to an original image (step S402). Then, image shift calibration and image blur calibration are respectively performed at the same time to respectively obtain a plurality of shift calibrated color channel images and a plurality of deblurred color channel images. The steps S404A-S410A of image shift calibration are the same as the steps S204-S210 in the embodiment illustrated in FIG. 2 and the steps S404B-S408B of image blur calibration are the same as the steps S304-S308 in the embodiment illustrated in FIG. 3 therefore will not be described herein. In the final step S412, the deblurred datum color channel image, the deblurred color channel images, the shift datum color channel image, and the shift calibrated color channel images are combined to obtain a final calibrated image. Thereby, both the shift calibration and blur calibration effects can be achieved.

Figure 5:
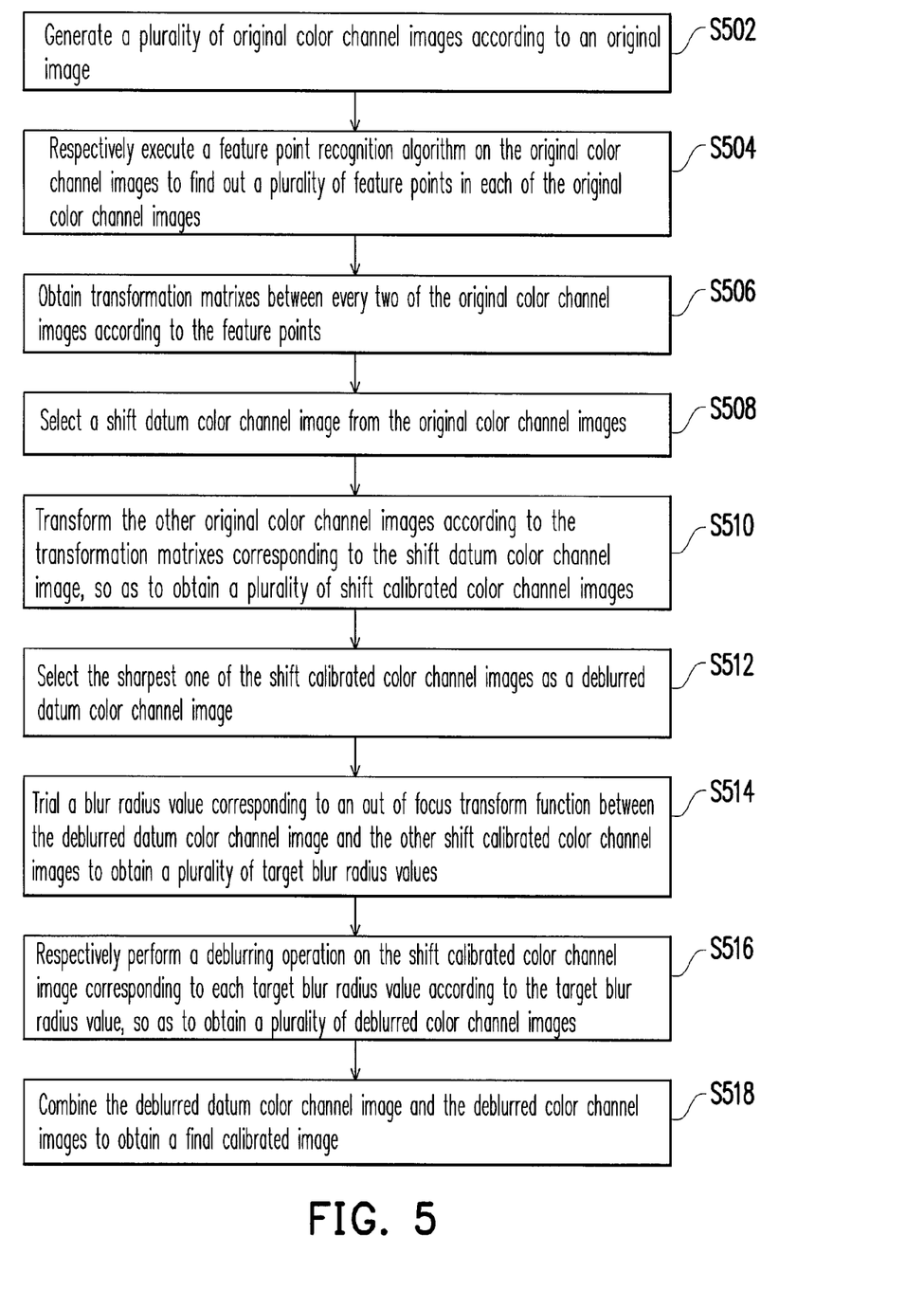

FIG. 5 is a flowchart of an image processing method according to still another embodiment of the invention. Referring to FIG. 5, the method for carrying out image calibration in the present embodiment is to perform shift calibration and then blur calibration. The steps S502-S510 in the present embodiment are the same as the steps S202-S210 in FIG. 2 therefore will not be described herein. After obtaining the shift calibrated color channel images in step S510, the image blur calibration method illustrated in FIG. 3 is carried out according to the shift calibrated color channel images. In step S512, the sharpest one of the shift calibrated color channel images is selected as a deblurred datum color channel image. Herein the sharpest shift calibrated color channel image may be selected by respectively performing a frequency spectrum analysis on the shift calibrated color channel images and selecting the shift calibrated color channel image having the greatest high frequency component as the deblurred datum color channel image.

Thereafter, a blur radius value corresponding to an out of focus transform function between the deblurred datum color channel image and the other shift calibrated color channel images is trialled to obtain a plurality of target blur radius values (step S514). For example, a blurring operation is performed on the deblurred datum color channel image according to a predetermined blur radius value, so as to obtain a plurality of trial color channel images, and whether the similarity between each of the trial color channel images and the corresponding shift calibrated color channel image reaches a predetermined standard is then determined. If the similarity does not reach the predetermined standard, the predetermined blur radius value is adjusted until the similarity reaches the predetermined standard. Besides, the blur radius value when the similarity reaches the predetermined standard is served as a target blur radius value.

Next, a deblurring operation is respectively performed on the shift calibrated color channel image corresponding to each target blur radius value according to the target blur radius value, so as to obtain a plurality of deblurred color channel images (step S516). Herein the deblurring operation is to perform a deconvolution operation on the out of focus transform function and the deblurred datum color channel image, and which may be a Wiener filter deconvolution operation, a Lucy-Richardson operation, or a Regularized operation. Finally, the deblurred datum color channel image and the deblurred color channel images are combined to obtain a final calibrated image (step S518). As described above, the problems of image blur and image shift caused by dispersion can be resolved and the image quality can be greatly improved by performing shift calibration and then blur calibration on an original image.

Figure 6:
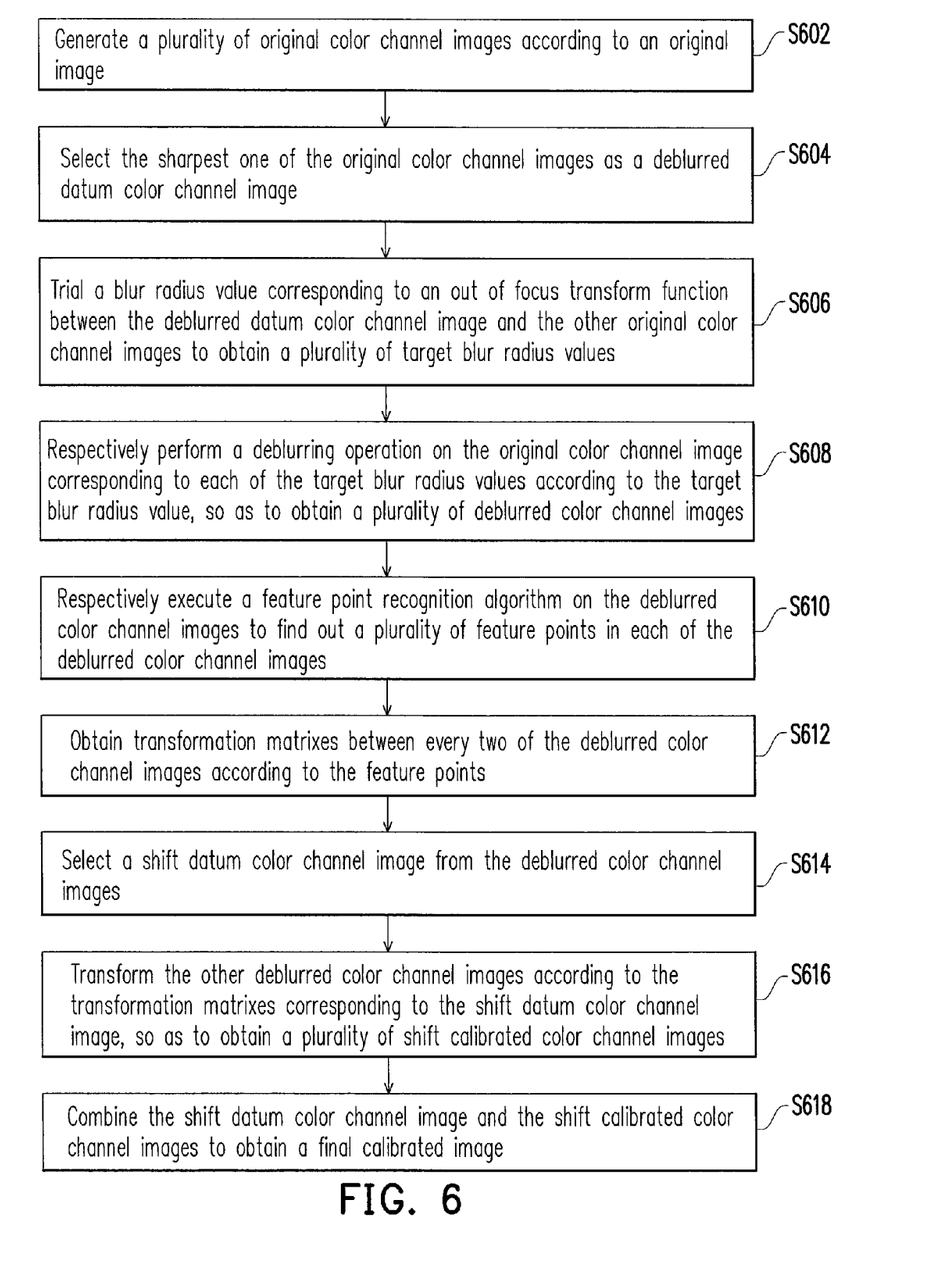

Similarly, the dispersion problem may also be resolved by performing the blur calibration and then the shift calibration. FIG. 6 is a flowchart of an image processing method according to yet still another embodiment of the invention. Referring to FIG. 6, the steps S602-S608 in the present embodiment are the same as the steps S302-S308 illustrated in FIG. 3 therefore will not be described herein. After obtaining the deblurred color channel images in step S608, the image shift calibration fabrication method illustrated in FIG. 2 is then carried out according to the deblurred color channel images. In step S610, a feature point recognition algorithm is respectively executed on the deblurred color channel images to find out a plurality of feature points in each of the deblurred color channel images, wherein the feature point recognition algorithm may be the SIFT algorithm or the SURF algorithm. Next, transformation matrixes between every two of the deblurred color channel images are obtained according to the feature points (step S612), and a shift datum color channel image is selected from the deblurred color channel images (step S614), wherein the original color channel image corresponding to the shift datum color channel image has the minimum distortion.

Thereafter, the other deblurred color channel images are transformed according to the transformation matrixes corresponding to the shift datum color channel image, so as to obtain a plurality of shift calibrated color channel images (step S616). The shift datum color channel image can be selected according to the modulus of the transformation matrixes between the deblurred color channel images. For example, the deblurred color channel image having the smallest modulus sum may be selected as the shift datum color channel image. Finally, the shift datum color channel image and the shift calibrated color channel images are combined to obtain a final calibrated image (step S618). Thereby, both shift calibration and blur calibration are performed on an original image so that the problems of image blur and image shift caused by dispersion can be resolved and the image quality can be greatly improved.

In summary, in the invention, a transformation matrix with the minimum distortion is selected to determine a shift datum color channel image, and the other color channel images are transformed accordingly to obtain a shift calibrated image. In addition, a blur radius value corresponding to an out of focus transform function between the deblurred datum color channel image and the other original color channel images is trialled to obtain a plurality of target blur radius values, and a plurality of deblurred color channel images are obtained accordingly, so as to obtain a blur calibrated image. Thereby, the problem of purple fringing and image blur caused by dispersion can be resolved without increasing the hardware cost. Thereby, the image quality can be greatly improved, and blur fabrication and/or shift calibration can be selectively performed on an original image according to the actual application situation, so that the image processing is made more efficient and flexible.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image processing system, comprising:
a photography apparatus having a processor and a storage apparatus, wherein the processor is configured to load a plurality of instruction from the storage apparatus to perform:
a color channel image generation module generating a plurality of original color channel images according to an original image;
a sharpness selection module selecting a sharpest original color channel image from the original color channel images as a deblurred datum color channel image;
an calculation module trialing a blur radius value corresponding to an out of focus transform function between the deblurred datum color channel image and the other original color channel images, so as to obtain a plurality of target blur radius values, and respectively performs a deblurring operation on the original color channel image corresponding to each of the target blur radius values according to the target blur radius value, so as to obtain a plurality of deblurred color channel images;
an image combination module combining the deblurred datum color channel image and the deblurred color channel images to obtain a blur calibrated image; and
an image feature recognition module respectively performing a feature point recognition algorithm on the original color channel images, so as to respectively find out a plurality of feature points in each of the original color channel images, wherein the calculation module further calculates transformation matrixes between every two of the original color channel images according to the feature points, and the calculation module selects a shift datum color channel image from the original color channel images, and according to transformation matrixes corresponding to the shift datum color channel image, the calculation module transforms the other original color channel images, so as to obtain a plurality of shift calibrated color channel images, wherein the original color channel image corresponding to the shift datum color channel image has the minimum distortion.

2. The image processing system as claimed in claim 1, wherein the photography device apparatus comprises a camera, a video camera, a telescope, or a microscope.

3. The image processing system as claimed in claim 1, wherein the sharpness selection module further respectively performs a frequency spectrum analysis on the original color channel images, and according to a result of the frequency spectrum analysis, the sharpness selection module selects the original color channel image having the largest high frequency component as the deblurred datum color channel image.

4. The image processing system as claimed in claim 3, wherein the calculation module further performs a blurring operation on the deblurred datum color image according to a predetermined blur radius, so as to obtain a plurality of trial color channel images, and the calculation module determines whether the similarity between each of the trial color channel images and the corresponding original color channel image reaches a predetermined standard, wherein the predetermined blur radius is adjusted when the similarity degree does not reach the predetermined standard, and the blur radius value is served as a target blur radius value when the similarity reaches the predetermined standard.

5. The image processing system as claimed in claim 4, wherein the blurring operation is to perform a convolution operation on the out of focus transform function and the deblurred datum color channel image, and the deblurring operation is to perform a deconvolution operation on the out of focus transform function and the deblurred datum color channel image.

6. The image processing system as claimed in claim 1, wherein the deblurring operation comprises a Wiener filter deconvolution operation, a Lucy-Richardson operation, or a regularized operation.

7. The image processing system as claimed in claim 1, wherein the image combination module further combines the shift datum color channel image and the shift calibrated color channel images to obtain a shift calibrated image, and the image combination module combines the blur calibrated image and the shift calibrated image to obtain a final calibrated image.

8. The image processing system as claimed in claim 7, wherein the calculation module further calculates a plurality of transformation feature points according to the feature points, the calculation module calculates transformation matrixes according to the transformation feature points, wherein each of the transformation feature points has a corresponding pixel in each of the original color channel images.

9. The image processing system as claimed in claim 8, wherein relative distances between the pixels corresponding to each transformation feature points in different original color channel images are smaller than three pixels wide.

10. The image processing system as claimed in claim 9, wherein the calculation module further selects the shift datum color channel image from the original color channel images according to the transformation matrixes.

11. The image processing system as claimed in claim 10, wherein the calculation module further calculates modulus of the transformation matrixes, and calculates modulus of the transformation matrixes corresponding to the original color channel images being transformed to a virtual shift datum color channel image when each of the original color channel images is served as the virtual shift datum color channel image, and the calculation module further selects the shift datum color channel image according to modulus of the transformation matrixes corresponding to the original color channel images when each of the original color channel images is served as the virtual shift datum color channel image.

12. The image processing system as claimed in claim 11, wherein the calculation module further calculates modulus sum of the corresponding transformation matrixes when each of the original color channel images is served as the virtual shift datum color channel image and selects the original color channel image having the smallest modulus sum as the shift datum color channel image.

13. The image processing system as claimed in claim 1, wherein the feature point recognition algorithm comprises a scale-invariant feature transform (SIFT) algorithm or a speeded-up robust features (SURF) algorithm.

14. An image processing method, comprising:
a plurality of original color channel images is generated according to an original image;
a sharpest one of the original color channel images is selected from the original color channel images as a deblurred datum color channel image;
a blur radius value corresponding to an out of focus transform function between the deblurred datum color channel image and the other original color channel images is trialled, so as to obtain a plurality of target blur radius values;
a deblurring operation is respectively performed on the original color channel image corresponding to each of the target blur radius values according to the target blur radius value, so as to obtain a plurality of deblurred color channel images;
respectively performing a feature point recognition algorithm on the original color channel images, so as to respectively find out a plurality of feature points in each of the original color channel images;
calculating the transformation matrixes between every two of the original color channel images according to the feature points;
selecting a shift datum color channel image from the original color channel images, wherein the original color channel image corresponding to the shift datum color channel image has the minimum distortion;
transforming the other original color channel images according to transformation matrixes corresponding to the shift datum color channel image, so as to obtain a plurality of shift calibrated color channel images; and
combining the deblurred datum color channel image, the deblurred color channel images, the shift datum color image, and the shift calibrated color images to obtain a final calibrated image.

15. The image processing method as claimed in claim 14, wherein the steps for selecting the sharpest original color channel image from the original color channel images as the deblurred datum color channel image comprise:
respectively performing a frequency spectrum analysis on the original color channel images; and
according to a result of the frequency spectrum analysis, selecting the original color channel image having a largest high frequency component as the deblurred datum color channel image.

16. The image processing method as claimed in claim 14, wherein the steps for trialing the blur radius value corresponding to the out of focus transform function between the deblurred datum color channel image and the other original color channel images comprise:
a blurring operation is performed on the deblurred datum color channel image according to a predetermined blur radius value to obtain a plurality of trial color channel images;
whether the similarity between each of the trial color channel images and the corresponding original color channel image reaches a predetermined standard is determined;
when the similarity does not reach the predetermined standard, the predetermined blur radius value is adjusted; and
when the similarity reaches the predetermined standard, the blur radius value is served as a target blur radius value.

17. The image processing method as claimed in claim 16, wherein the blurring operation is to perform a convolution operation on the out of focus transform function and the deblurred datum color channel image, and the deblurring operation is to perform a deconvolution operation on the out of focus transform function and the deblurred datum color channel image.

18. The image processing method as claimed in claim 14, wherein the deblurring operation comprises a Wiener filter deconvolution operation, a Lucy-Richardson operation, or a regularized operation.

19. The image process method as claimed in claim 14, wherein the steps for calculating the transformation matrixes between every two of the original color channel images according to the feature points comprise:
   calculating a plurality of transform feature points according to the transformation feature points according to the feature points, wherein each of the transformation feature points has a corresponding pixel in each of the original color channel images; and
   calculating the transformation matrixes according to the transformation feature points.

20. The image processing method as claimed in claim 19, wherein relative distances between the pixels corresponding to each transformation feature points in different original color channel images are smaller than three pixels wide.

21. The image processing method as claimed in claim 14, wherein the steps for selecting the shift datum color channel image from the original color channel images comprise:
   selecting the shift datum color channel image from the original color channel images according to the transformation matrixes.

22. The image processing method as claimed in claim 21, wherein the steps for selecting the shift datum color channel image from the original color channel images according to the transformation matrixes comprise:
   calculating a modulus of the transformation matrixes;
   calculating modulus of the transformation matrixes corresponding to the original color channel images being transformed to a virtual shift datum color channel image when each of the original color channel images is served as the virtual shift datum color channel image; and
   selecting the shift datum color channel image according to modulus of the transformation matrixes corresponding to the original color channel images when each of the original color channel images is served as the virtual shift datum color channel image.

23. The image processing method as claimed in claim 22, wherein the steps for selecting the shift datum color channel image according to modulus of the transformation matrixes corresponding to the original color channel images when each of the original color channel images is served as the virtual shift datum color channel image comprise:
   calculates modulus of the corresponding transformation matrixes when each of the original color channel images is served as the virtual shift datum color channel image; and
   selecting the original color channel image having the smallest modulus sum as the shift datum color channel image.

24. The image processing method as claimed in claim 14, wherein the feature point recognition algorithm comprises a scale-invariant feature transform (SIFT) algorithm or a speeded-up robust features (SURF) algorithm.

* * * * *